(12) United States Patent
Gupta et al.

(10) Patent No.: US 11,592,389 B2
(45) Date of Patent: Feb. 28, 2023

(54) SYSTEM AND METHOD OF PROVIDING INCOHERENT COUPLING OF A LASER INTO A HIGH FINESSE OPTICAL CAVITY

(71) Applicant: Nikira Labs Inc., Mountain View, CA (US)

(72) Inventors: Manish Gupta, Mountain View, CA (US); Rupal Gupta, Mountain View, CA (US)

(73) Assignee: NIKIRA LABS INC., Mountain View, CA (US)

( * ) Notice: Subject to any disclaimer, the term of this patent is extended or adjusted under 35 U.S.C. 154(b) by 64 days.

(21) Appl. No.: 17/166,661

(22) Filed: Feb. 3, 2021

(65) Prior Publication Data
US 2022/0244172 A1   Aug. 4, 2022

(51) Int. Cl.
*G01N 21/31* (2006.01)
*G02B 5/10* (2006.01)
*G02B 27/30* (2006.01)

(52) U.S. Cl.
CPC ........... *G01N 21/31* (2013.01); *G02B 5/10* (2013.01); *G02B 27/30* (2013.01); *G01N 2201/0231* (2013.01); *G01N 2201/0633* (2013.01); *G01N 2201/0636* (2013.01); *G01N 2201/06113* (2013.01)

(58) Field of Classification Search
CPC ........... G02B 27/30; G01N 2201/0633; G01N 2201/06113; G01N 2201/0231
See application file for complete search history.

(56) References Cited

U.S. PATENT DOCUMENTS

| 4,793,709 A | 12/1988 | Jabr et al. |
| 5,291,265 A | 3/1994 | Kebabian |
| 5,432,610 A | 7/1995 | King et al. |
| 5,528,040 A | 6/1996 | Lehmann |

(Continued)

OTHER PUBLICATIONS

Wang, "Development of a portable cavity-enhanced absorption spectrometer for the measurement of ambient NO3 and N2O5: experimental setup, lab characterizations, and field applications in a polluted urban environment", Sep. 27, 2016 (Year: 2016).*

(Continued)

*Primary Examiner* — Maurice C Smith
(74) *Attorney, Agent, or Firm* — Loza & Loza, LLP; David S. Sarisky

(57) ABSTRACT

An optical system for performing an absorption measurement of a medium sample includes a laser source configured to output a laser beam having a wavelength corresponding to an absorption region of interest; a ringdown cavity comprising a chamber configured to receive the medium sample, an input mirror at an input end, an output mirror at an output end, and an optical axis that extends through the centers of the input mirror and the output mirror; a coupling device configured to couple the laser beam through the input mirror into the chamber; and a detector optically coupled with the cavity, and configured to detect an intensity of light of the wavelength corresponding to the absorption region of interest that extends through the output mirror, wherein a cavity geometry of the cavity increases the re-entrant condition of the cavity relative to a conventional cavity comprised of two spherical mirrors.

15 Claims, 7 Drawing Sheets

(56) References Cited

U.S. PATENT DOCUMENTS

| | | | |
|---|---|---|---|
| 5,912,740 | A | 6/1999 | Zare et al. |
| 6,795,190 | B1 | 9/2004 | Paul et al. |
| 7,307,716 | B2 | 12/2007 | Silver |
| 10,048,196 | B2 | 8/2018 | Harb et al. |

OTHER PUBLICATIONS

Jérémie Courtois, "High-speed off-axis Cavity Ring-Down Spectroscopy with a re-entrant configuration for spectral resolution enhancement", 2010, Optical Society of America (Year: 2010).*
Manish Gupta, "Optimization of Off-Axis ICOS and Applications to Flow Tube Kinetics", 2003 (Year: 2003).*
Jianhui Liu, "Design and research of built-in sample cell with multiple optical reflections" Oct. 24, 2017 (Year: 2017).*
PCT/US2022/014562. International Search Report & Written Opinion (dated Apr. 22, 2022).
McManus et al. "Astigmatic mirror multipass absorption cells for long-path-length spectroscopy." Appl. Opt. 34, 3336-3348 (1995).
Schwarm et al. "Calibration-free breath acetone sensor with interference correction based on wavelength modulation spectroscopy near 8.2 μm." Appl. Phys. B 126, 9 (2020).

* cited by examiner

SYSTEM AND METHOD OF PROVIDING INCOHERENT COUPLING OF A LASER INTO A HIGH FINESSE OPTICAL CAVITY

GOVERNMENT LICENSE RIGHTS

This invention was made with government support under SBIR Phase 1 Contract No. 1745840 awarded by the National Science Foundation. The government has certain rights in the invention.

TECHNICAL FIELD

The present disclosure relates generally to optical systems and methods, and more particularly, to optical systems and method of providing incoherent coupling of a laser into a high finesse optical cavity. High finesse, in this context, means that the optical cavity has very low optical loss.

BACKGROUND

Cavity-enhanced absorption spectroscopy (CEAS) systems are used in numerous applications to measure compounds that are of environmental, industrial, medical, and military interest. Typically, in CEAS, a laser is coupled into a high-finesse optical cavity comprised of two, highly-reflective (R>99.9% typical) mirrors. Optical loss within the cavity is then measured by modulating the laser (cavity ringdown spectroscopy), measuring the transmitted intensity (integrated cavity output spectroscopy), or employing other similar methods.

One of the key challenges in CEAS system is coupling the laser into the cavity. In conventional, coherent coupling, a laser of good mode-quality must be perfectly directed into a very well aligned cavity. In other words, the laser must perfectly align with the centerline of the two mirrors. This perfect alignment is difficult to achieve. In addition to the very stringent alignment requirements, the laser frequency must match a cavity resonance frequency. This is done by either tuning and measuring the laser wavelength very accurately or by tuning the cavity by moving one of its mirrors in less than 1 micron increments using a piezoelectric.

Prior solutions to the forgoing challenges have focused on either using an incoherent light source or coupling the light into the cavity in an off axis fashion. The first solution involves using a light source (e.g. light emitting diode, broadband laser, or similar) whose spectral bandwidth spans multiple cavity longitudinal modes. In this scheme, there is no need to frequency-match the laser and cavity as the laser linewidth automatically spans multiple modes. Note that this method is not suited for high-resolution spectroscopy and sometimes suffers from optical feedback issues. The second solution involves aligning the laser beam into the cavity in an off-axis fashion. In this scheme, the input beam couples to multiple cavity transverse modes, which, for non-degenerate cases, provides incoherent coupling. This method typically requires larger mirrors, e.g., 2" diameter, for sufficient off-axis alignment and piezoelectric mirror dithering to remove residual etalon effects.

SUMMARY

In one aspect, the disclosure relates to an optical system for performing an absorption measurement of a medium sample, e.g., gas sample, liquid sample, etc. The system includes a laser source, a ringdown cavity, a coupling device, and a detector. The laser source is configured to output a laser beam having a wavelength corresponding to an absorption region of interest. The ringdown cavity includes a chamber configured to receive the medium sample, an input mirror at an input end of the chamber, an output mirror at an output end of the chamber, and an optical axis that extends through the center of the input mirror and the center of the output mirror. The coupling device is configured to couple the laser beam through the input mirror into the chamber as one of a single narrow-diameter laser beam or a large-diameter laser beam. The detector is optically coupled with the ringdown cavity, and is configured to detect an intensity of light of the wavelength corresponding to the absorption region of interest that extends through the output mirror. A cavity geometry, e.g., mirror designs and/or cavity length, of the ringdown cavity increases the re-entrant condition of the cavity relative to a conventional cavity comprised of two spherical mirrors.

In a detailed aspect, the cavity geometry of the ringdown cavity is defined in part by a respective design of each of the input mirror and the output mirror having a total spot overlap area less than the total spot overlap area of a spherical mirror. The respective design of at least one of the input mirror and the output mirror may be astigmatic. The respective design of each of the input mirror and the output mirror may be astigmatic. The respective design of each of the input mirror and the output mirror may be one of spherical or cylindrical. The respective design of one of the input mirror and the output mirror may be spherical and the respective design of the other of the input mirror and the output mirror may be cylindrical.

In another detailed aspect, the cavity geometry of the ringdown cavity is further defined by a cavity length. The cavity length may correspond to a length that results in the smallest total spot overlap area for the respective designs of each of the input mirror and the output mirror. Alternatively, the cavity length may correspond to a length that results in the highest transverse mode density for the respective designs of each of the input mirror and the output mirror.

In another detailed aspect, the coupling device of the optical system is configured to couple a single narrow-diameter laser beam through the input mirror along an axis offset from the optical axis of the cavity. The coupling device may include a collimator configured to couple a large-diameter laser beam, e.g., between 7-15 mm, through the input mirror as a plurality of laser beams along a corresponding plurality of axes, wherein at least one of the corresponding plurality of axes is offset from the optical axis.

In another detailed aspect, the cavity is configured to manipulate the medium sample within the chamber to induce phase shifting of the laser beam within the chamber. To this end, the cavity may include an input valve in fluid communication with a medium source, that is configured to inject a medium sample into the chamber at a velocity that manipulates the gas sample by inducing turbulence inside the chamber. The cavity may further include an input valve in fluid communication with a medium source, that is configured to inject a medium sample into the chamber; and an output valve in fluid communication with the chamber, that is configured to discharge the medium sample from the chamber. At least one of the input valve and the output valve is further configured to switch between open and closed states at a rate that manipulates the gas sample by inducing pressure variations inside the chamber. The cavity may include a temperature device configured to switch between open and closed states at a rate that manipulates the gas sample by inducing temperature variations inside the chamber.

In one aspect, the disclosure relates to a method of performing an absorption measurement of a medium sample. The method includes coupling a laser beam having a wavelength corresponding to an absorption region of interest into a ringdown cavity. The ringdown cavity includes a chamber, an input mirror at an input end of the chamber, an output mirror at an output end of the chamber, and an optical axis that extends through the center of the input mirror and the center of the output mirror. A cavity geometry of the ringdown cavity increases a re-entrant condition of the cavity relative to a conventional cavity comprised of two spherical mirrors. The method also includes injecting a medium sample into the chamber; and detecting an intensity of light of the wavelength corresponding to the absorption region of interest that extends through the output mirror.

In a detailed aspect, the cavity geometry is defined in part by a respective design of each of the input mirror and the output mirror having a total spot overlap area less than the total spot overlap area of a spherical mirror. In another detailed aspect, the cavity geometry is defined in part by a cavity length corresponding to a length that results in the smallest total spot overlap area or the highest transverse mode density for respective designs of each of the input mirror and the output mirror.

In another detailed aspect, the method further includes manipulating the medium sample within the chamber to induce phase shifting of the laser beam within the chamber. Such manipulation may include at least one of inducing turbulence inside the chamber, inducing pressure variations inside the chamber, and inducing temperature variations inside the chamber.

It is understood that other aspects of apparatuses and methods will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of apparatuses and methods will now be presented in the detailed description by way of example, and not by way of limitation, with reference to the accompanying drawings, wherein.

DETAILED DESCRIPTION

Disclosed herein are systems and methods for performing an absorption measurement of a sample medium within a cavity based on cavity-enhanced absorption spectroscopy (CEAS). Applying one or more disclosed techniques, the systems and methods couple a laser to the cavity in a way that lengthens the re-entrant condition of the cavity and thereby reduces optical interference in the system and noise in the absorption measurement. While any one of the disclosed techniques may be sufficient alone to provide a desired level of reduction in optical interference, even greater levels of interference reduction may be achieved using a combination of the techniques. The disclosed techniques include cavity geometry optimization, laser beam reshaping, and sample medium manipulation.

As used herein "optical interference" means a condition that occurs when two or more laser beams with a fixed phase relationship meet or overlap at a same point on a detector. Such optical interference is observed at the detector.

"Incoherency" describes a condition when multiple laser beams do not have a fixed phase relation and thus cannot generate a fixed interference pattern on a detector.

"Re-entrant condition" means the condition where a laser beam interferes with itself or overlaps itself within the cavity. The re-entrant condition may be quantified in terms of a "re-entrant pathlength" corresponding to the total the distance that a laser beam travels back and forth between mirrors within a cavity before it interferes with itself. The re-entrant condition may also be quantified by the number of passes a laser beam makes within a cavity before it interferes with itself, where a single pass corresponds to a bounce or reflection of a beam from one mirror to the other mirror within a cavity. In either case, it is desirable to have the re-entrant pathlength be as long as possible, or the number of passes as large as possible.

"Cavity geometry" means the physical characteristics of an optical cavity, including the shape, e.g., spherical, non-spherical, astigmatic, etc., and size of its mirrors, and the length of its cavity chamber.

Figure 1:
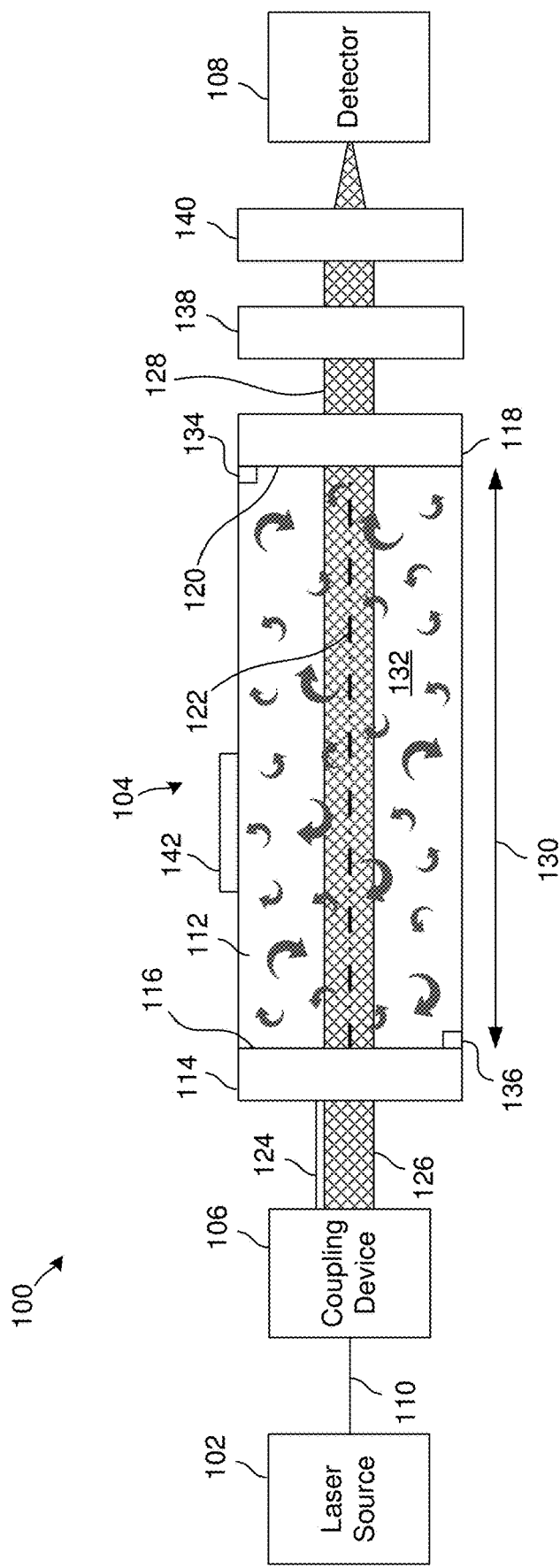
FIG. 1 is a schematic block diagram of an optical system configured in accordance with embodiments disclosed herein.

With reference to FIG. 1, an optical system 100 for performing an absorption measurement of a medium sample 132 includes a laser source 102, a ringdown cavity 104, a coupling device 106, and a detector 108. The laser source 102 is configured to output a laser beam 110 having a wavelength corresponding to an absorption region of interest. The laser source 102 may be, for example, a distributed feedback, telecommunications-grade butterfly diode laser or quantum cascade laser or dye laser, having a wavelength that may span the entire spectral range from ultraviolet (UV) to infrared (IR).

The ringdown cavity 104 includes a chamber 112, an input mirror 114 at an input end 116 of the chamber, an output mirror 118 at an output end 120 of the chamber, and an optical axis 122 that extends through the center of the input mirror and the center of the output mirror. The chamber 112 is configured to receive the medium sample 132 through an input value 134 associated with the output end 120 of the chamber, and to discharge the sample medium 132 through an output value 136 associated with the input end 116 of the chamber.

The coupling device 106 is configured to couple the laser beam 110 through the input mirror 114 into the chamber 112 as one of a single narrow-diameter laser beam 124 or a large-diameter laser beam 126. In one configuration, the cavity 104 is high-reflective over a narrow spectral range, e.g., 1560-1650 nm. The detector 108 is optically coupled with the cavity 104, and is configured to detect an intensity of light 128 of the wavelength corresponding to the absorption region of interest that extends through the output mirror 118. In one configuration, the detector 108 is optically coupled with the cavity 104 through a bandpass filter 138 and a lens 140. The bandpass filter 138 blocks light that is outside the spectral range of the cavity 104 and thus mitigates stray noise and non-lasing light (broadband emission from the laser). The lens 140 focuses the light transmitted through the cavity 104 onto the detector 108.

As disclosed herein, the cavity 104 is configured to increase the re-entrant condition of the cavity relative to a standard, such as a stable Fabry Perot resonator, while the coupling device 106 is configured to couple into a higher mode density of the cavity. The increase in re-entrant condition of the cavity 104 may be quantified in terms of a total spot overlap area. For example, the re-entrant condition of a cavity may be increased through cavity geometry design, e.g., mirror design and cavity length. To this end, a measure of total spot overlap area for each of a number of different cavity geometries may be obtained under common test conditions and compared to determine which cavity design produces the smallest total spot overlap area. A common test condition may be the total number of passes of a laser beam within the cavity under design.

Having generally described the optical system 100, the various techniques for coupling a laser to the cavity in a way that increases the re-entrant condition of the cavity and thereby reduces optical interference in the system and noise in the absorption measurement are now described in detail.

Optimizing Cavity Geometry

For a conventional coherent CEAS system, the cavity is comprised of two spherical mirrors with radii of curvature (ROC) that satisfy the resonator stability criteria. For example, a typical cavity would measure ~0.5 meters in length and include two highly-reflective (R=99.99%) spherical mirrors with 1 meter ROCs at opposite ends of a chamber. The two highly-reflective spherical mirrors would be aligned relative to each other such that the mirrors share the same centerline and have equal, but opposite normal axes.

In this conventional coherent CEAS system, a laser beam couples to the cavity through one of the highly-reflective spherical mirrors corresponding to a front mirror, in an on-axis manner that aligns the beam along the centerline. As such, the laser beam retroreflects back from the other highly-reflective spherical mirror corresponding to a back mirror onto itself. This back-and-forth retroreflection between the front mirror and back mirror continues providing an enhanced effective optical pathlength. The average photon travels a length of $L/(1-R)$ where L is the cavity length and R is the mirror reflectivity (e.g. R=0.9999). Since, for a typical laser, the coherence length is much longer than the cavity length, (for example, the coherence length of a DFB diode laser is about 100 meters, with a linewidth of 3 MHz), the overlapping laser beams will interfere, resulting in intensity noise and the need to precisely match the cavity resonant frequency to the laser frequency, which as mentioned previously, is very difficult to do.

Figure 2:
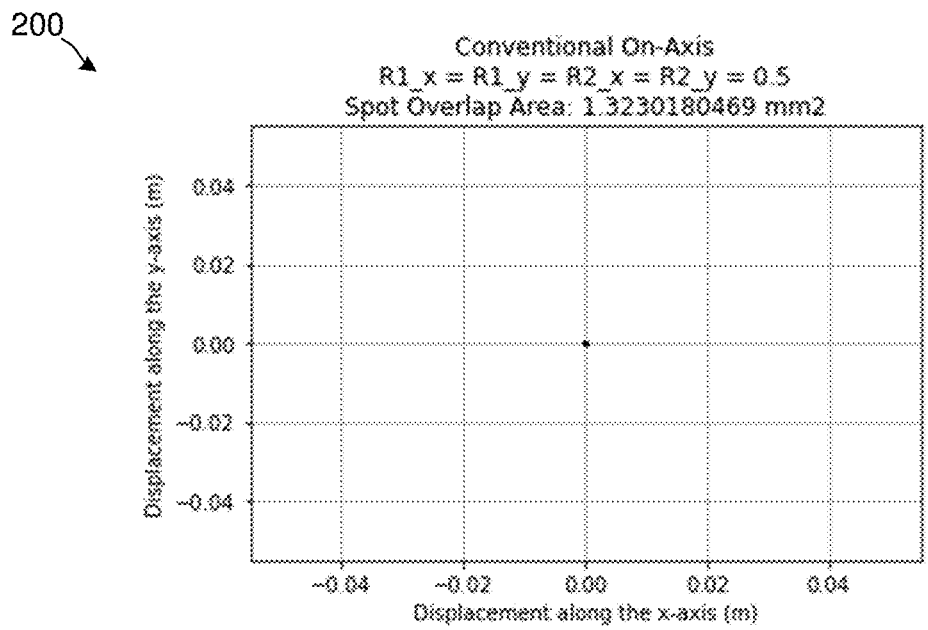
FIG. 2 is a spot pattern resulting from a conventional, on-axis alignment of a laser beam within an optical cavity.

With reference to FIG. 2, in this conventional on-axis coherent CEAS system the spot pattern 200 on the back mirror is a single dot in the center of the back mirror, representing that the beam overlaps with itself after a single pass or single round trip through the cavity. Thus, the re-entrant condition for this conventional on-axis coherent CEAS system is one pass. This conventional on-axis alignment has a very high spot overlap indicative of high optical interference noise.

For a conventional incoherent CEAS system, the cavity structure is essentially the same as described above for the coherent CEAS system. In the incoherent system, however, the laser beam couples into the cavity through the front mirror in an off-axis manner that aligns the beam along a path that is offset from the centerline of the cavity.

Figure 3:
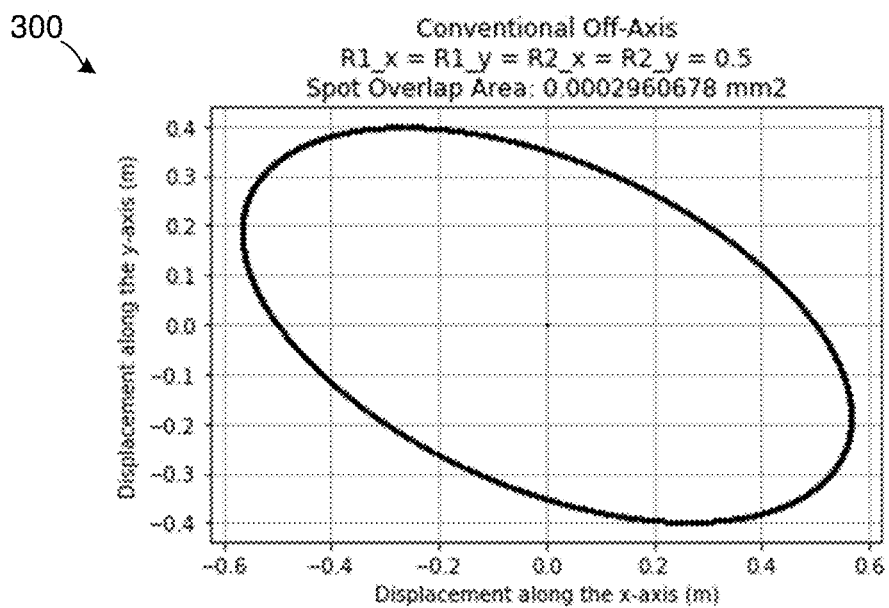
FIG. 3 is a spot pattern resulting from a conventional, off-axis alignment of a laser beam within an optical cavity.

With reference to FIG. 3, in this conventional off-axis coherent CEAS system the spot pattern 300 on the back mirror is an ellipse having a center aligned with the center of the back mirror. The ellipse represents that the laser beam makes several passes within the cavity before it overlaps with itself. In one example, the re-entrant condition is ~20-40 passes. This conventional off-axis alignment reduces the spot overlap of the on-axis alignment (shown in FIG. 2) by a substantial factor. This reduction, however, is contingent upon proper alignment of the mirrors and the input beam, which is difficult to achieve because any small change in input beam alignment results in a different pattern.

Thus additional techniques for increasing re-entrant conditions and reducing spot overlap (or creating highly dispersed spot patterns) are needed.

With reference to FIG. 1, in accordance with techniques disclosed herein cavity geometry of the cavity 104 may be optimized to increase incoherency or the re-entrant condition through cavity mirror design of the input mirror 114 and the output mirror 118, and the length 130 of the cavity chamber 112. For example, regarding the input mirror 114 and the output mirror 118, instead of using conventional spherical mirrors, the disclosed system and methods may use non-spherical mirrors, including for example, cylindrical mirrors and astigmatic mirrors. Doing so minimizes laser spot overlap on the input mirror 114 and the output mirror 118 and thus increases the re-entrant pathlength.

Continuing with FIG. 1, in accordance with techniques disclosed herein, the input mirror 114 and the output mirror 118 of the optical system 100 have similar reflectivity, e.g., are both highly-reflective mirrors, but have different radii of curvature relative to each other. These radii are optimized to avoid spot overlap and thereby provide spot overlap areas greater than mirror configuration, such as shown in FIGS. 2 and 3. Configuring the input mirror 114 and the output mirror 118 in this manner provides a very long, e.g., approximately 1000 passes, re-entrant condition.

Ray tracing allows the calculation of a spot pattern on each of the input mirror 114 and the output mirror 118. Then, assuming that each spot has a specific diameter, a total spot overlap area is calculated based on the spot patterns of each of the input mirror 114 and the output mirror 118. This total spot overlap area is directly related to the interference noise of the cavity 104.

FIGS. 4-7 are example spot patterns resulting from different set of mirrors 114, 118. These mirrors 114, 118 can be, for example, spherical mirrors or cylindrical mirrors or astigmatic mirrors. In the examples of FIGS. 4-7, the first cavity mirror has a x and y radius of curvature ($R1x$ and $R1y$). Likewise, the second cavity mirror has a x and y radius of curvature ($R2x$ and $R2y$). For a spherical mirror, the x and y radii of curvature match (e.g. $R1x=R1y$ and $R2x=R2y$). For an astigmatic mirror, $R1x$ is not equal to $R1y$ and/or $R2x$ is not equal to $R2y$. For a cylindrical mirror, either $R1x$ or $R1y$ equal infinity (there is no curvature along one axis). The other axis remains curved.

Figure 4:
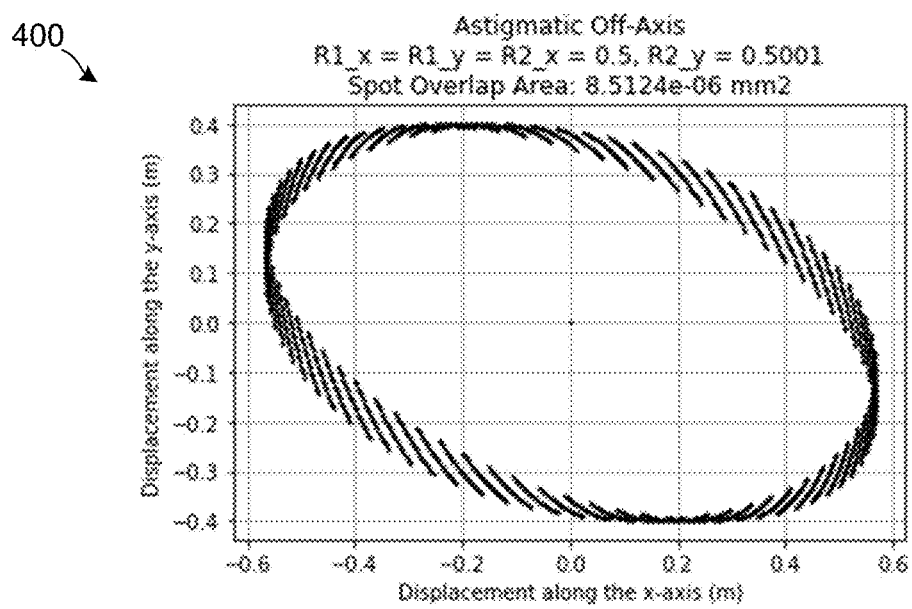
FIGS. 4-7 are spot patterns resulting from different cavity geometries configured in accordance with disclosed embodiments.

FIG. 4 shows the calculated spot pattern 400 for a narrow (1 mm) laser beam on the rear (output) mirror for a 22 cm long cavity that is comprised of one spherical mirror (R1x=R1y=50 mm) and one slightly astigmatic mirror (R2x=50 mm and R2y=50.01 mm). Assuming that each spot has a diameter of 1 mm, the total overlap area of all of the spots may be calculated as sum of all overlap area between the spots. For this geometry, this spot overlap area is 8.5e-6 mm2.

Figure 5:
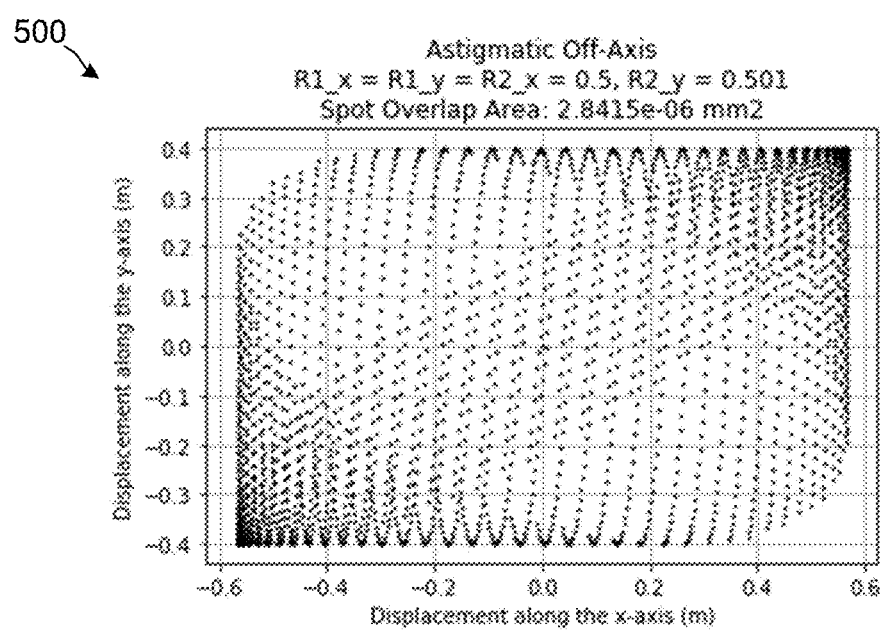

FIG. 5 shows the spot pattern 500 for a narrow (1 mm) laser beam on the rear (output) mirror for a 22 cm long cavity that is comprised of one spherical mirror (R1x=R1y=50 mm) and one slightly astigmatic mirror (R2x=50 mm and R2y=50.1 mm). Assuming that each spot has a diameter of 1 mm, the total overlap area of all of the spots may be calculated as the sum of all overlap area between the spots. For this geometry, this spot overlap area is 2.8e-6 mm2.

Figure 6:
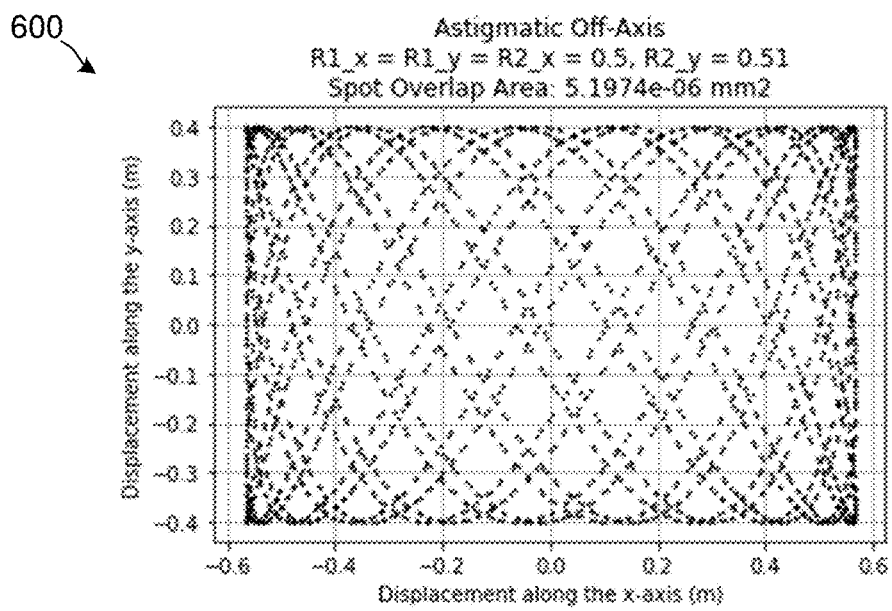

FIG. 6 shows the spot pattern 600 for a narrow (1 mm) laser beam on the rear (output) mirror for a 22 cm long cavity that is comprised of one spherical mirror (R1x=R1y=50 mm) and one astigmatic mirror (R2x=50 mm and R2y=51 mm). Assuming that each spot has a diameter of 1 mm, the total overlap area of all of the spots may be calculated as the sum of all overlap area between the spots. For this geometry, this spot overlap area is 5.2e-6 mm2.

Figure 7:
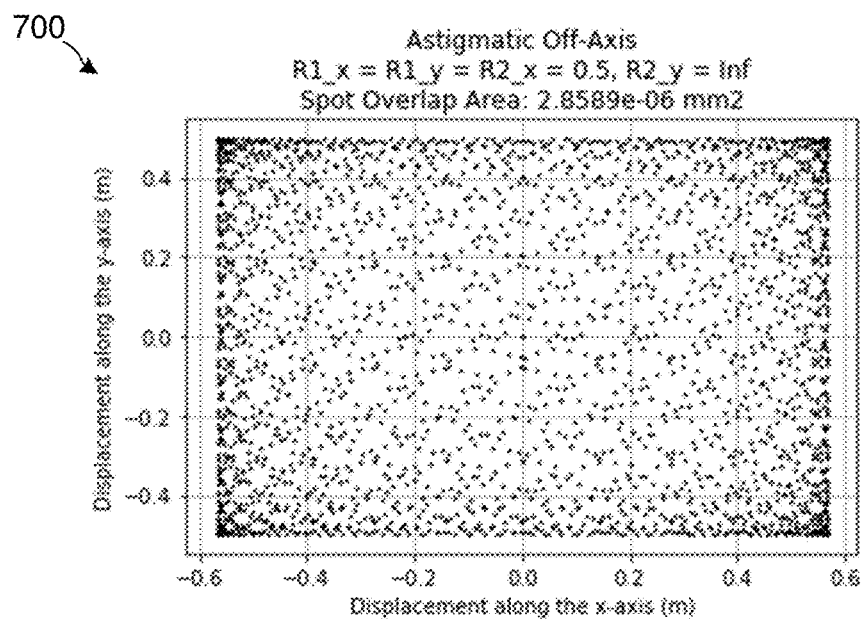
Figure 8:
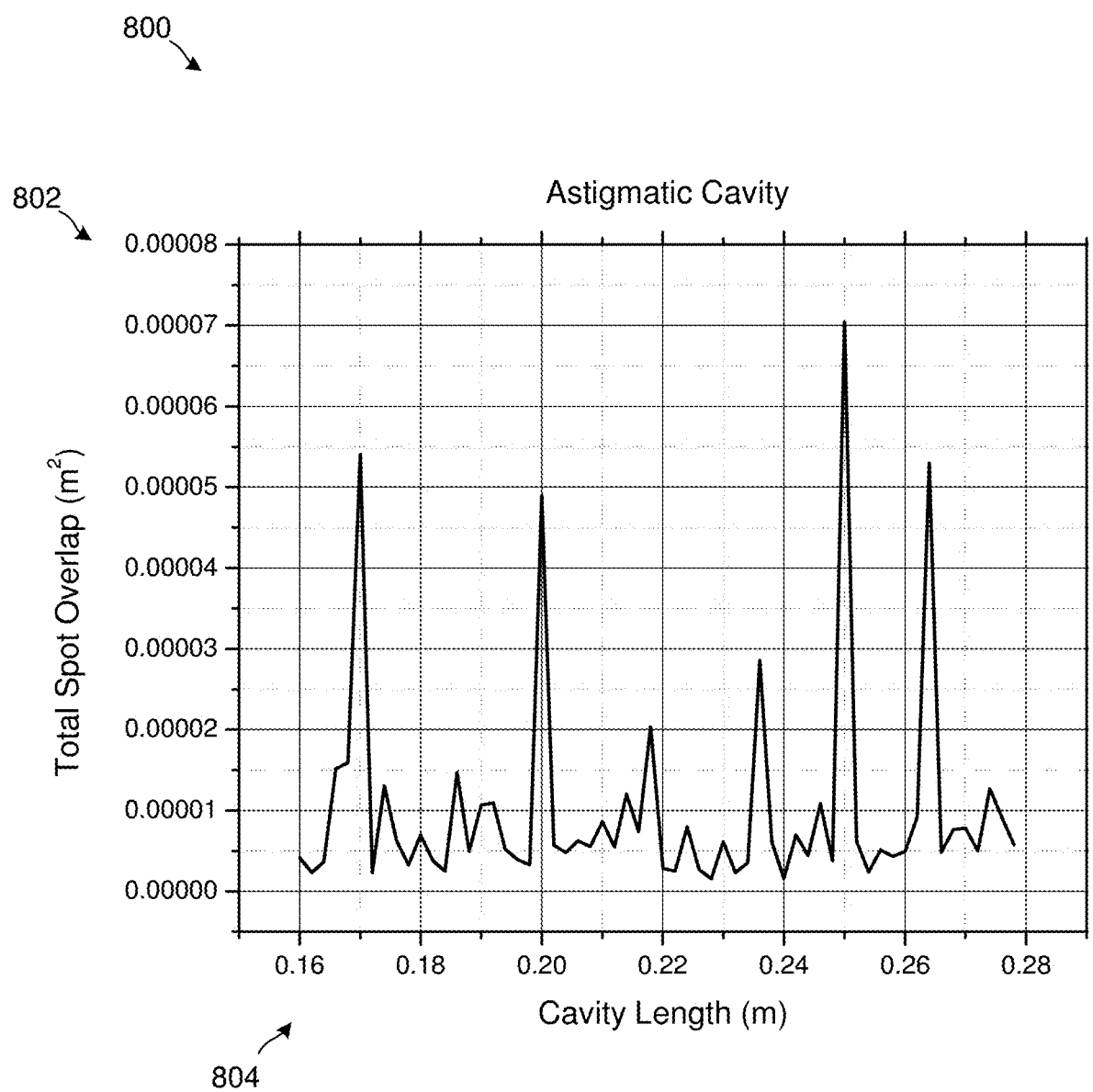
FIG. 8 is a graph of total spot overlap area as a function of cavity length for a cavity geometry having a cavity geometry configured in accordance with disclosed embodiments.

FIG. 7 shows the spot pattern 700 for a narrow (1 mm) laser beam on the rear (output) mirror for a 22 cm long cavity that is comprised of one spherical mirror (R1x=R1y=50 mm) and one cylindrical mirror (R2x=50 mm and R2y=Infinity). Assuming that each spot has a diameter of 1 mm, the total overlap area of all of the spots may be calculated as the sum of all overlap area between the spots. For this geometry, this spot overlap area is 2.8e-6 mm2.

Note that the spot overlap area reduces from 1.3 mm2 to 3e-4 mm2 by going from on-axis to off axis (FIG. 2 and FIG. 3). The spot overlap area is then further reduced by using an astigmatic rear mirror (FIG. 4-FIG. 7). Since the optical interference noise is related to the spot overlap area, the astigmatic cavity provides substantially less noise than an on-axis or conventional off-axis configuration.

Another aspect of optimizing cavity geometry includes cavity length adjustment. The cavity length 130 may be optimized to provide minimum spot overlap. To this end, in one configuration, the cavity length 130 may be selected by, for example, calculating the total spot overlap area for a large number, e.g., 1000, of passes of the laser beam through the cavity 104, as a function of different cavity lengths using a ray tracing simulation. The cavity length with the smallest total spot overlap area is selected as the cavity length 130.

Figure 9:
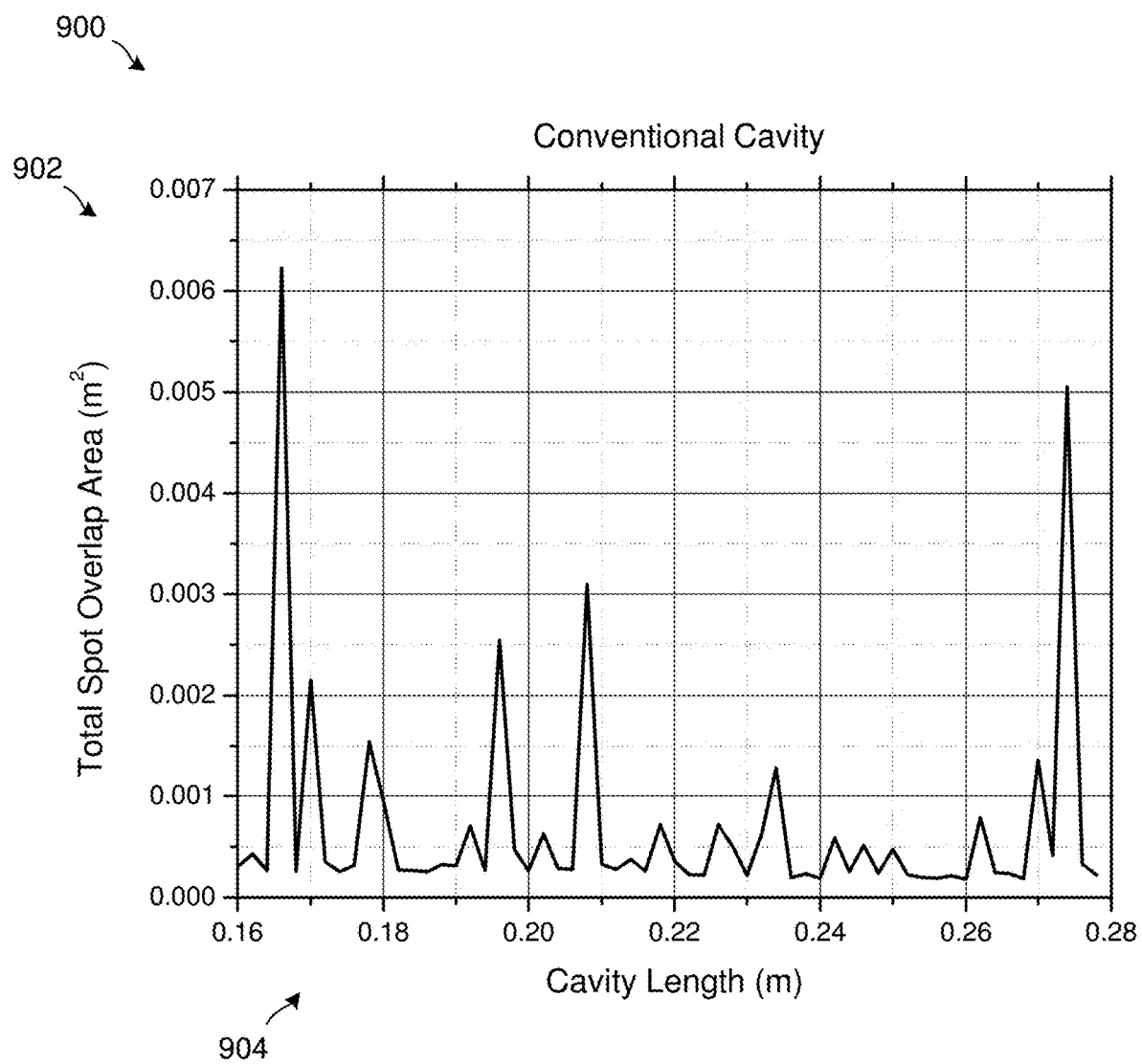
FIG. 9 is a graph of total spot overlap area as a function of cavity length for a conventional cavity.

With reference to FIG. 9, a graph 900 shows total spot overlap area 902 as a function of cavity length 904 for a cavity comprised of one spherical and one astigmatic mirror. Note that the total spot overlap area 902 varies dramatically with cavity length 904, and specific lengths provide a lower total spot overlap area and less interference.

This cavity length optimization applies for cavities comprised of spherical mirrors as well. For example, with reference to FIG. 10, a graph 100 shown total spot overlap area 1002 as a function of cavity length 1004 for a cavity comprised of two spherical mirrors. Note that, once again, there are particular lengths that provide lower total spot overlap areas 1002 and better cavity geometries.

Alternatively, a cavity length 130 that provide the highest transverse mode density may be selected for the cavity geometry.

To this end, the frequency of each transverse mode of the cavity is calculated using known techniques, such as disclosed in Fox, A. G. and Li, T., 1961. Resonant modes in a maser interferometer. Bell System Technical Journal, 40(2), pp. 453-488, the disclosure of which is incorporated by reference. The transverse mode density of the cavity is then calculated based on the transverse modes of the cavity. In one embodiment, the transverse mode density is increased by astigmatizing the cavity mirrors.

Input Laser Beam Reshaping

With reference to FIG. 1, in accordance with techniques disclosed herein increased incoherency and an increased re-entrant condition for a system 100 may be obtained by reshaping a small-diameter laser beam 124 into a large-diameter laser beam 126 at the input end of the cavity 104 to thereby—in effect—couple multiple input beams with the cavity in multiple directions. This technique exploits the high transverse mode density of the cavity 104, by coupling the laser beam 126 into as many modes as possible that do not significantly increase optical loss. Unlike conventional designs that couple a small-diameter laser beam 124 to cavity geometries, this large-diameter beam 126 is essentially independent of alignment issues. In other words, the system 100 does not depend on alignment between the large-diameter laser beam 126 and cavity centerline 122.

With continued reference to FIG. 1, in this embodiment the small-diameter, collimated or slightly focused laser beam 110 output by the laser source 102 is input to a coupling device 106 that is configured to increase the diameter of the beam prior to coupling it to the cavity 104. For example, a 1 mm diameter laser beam 110 output by the laser source 102 may be input to a coupling device 106 comprising a large beam collimator that reshapes the input beam 110 into a large-diameter laser beam 126 that is 7-15 mm in diameter. This large-diameter beam 126 couples to a much larger number of transverse modes relative to the cavity 104, thereby providing lower noise.

Each of the multiple beams coupled to the cavity 104 experiences its own re-entrant condition that results in a spot pattern like those describe above with reference to FIGS. 4-7. The combination of these individual spot patterns produces a full spot pattern.

Medium Sample/Cavity Manipulation

With reference to FIG. 1, in accordance with techniques disclosed herein increased incoherency or an increased re-entrant condition may be obtained by manipulating the medium sample 132 that is input to the system 100 to induce refractive index gradients within the cavity 104. These manipulations may include introducing turbulence, pressure fluctuation, or thermal fluctuations within the medium sample 132, e.g., gas sample or liquid sample, in the chamber 112 of the cavity 104. As a result of these manipulations of the medium sample 132, the phase of the laser beam 124, 126 keeps changing as it passes through the medium sample, and the laser beam does not interfere with itself.

With continued reference to FIG. 1, manipulation of the medium sample 132 to induce varying phase relationship between laser beams may be achieved by rapidly flowing the medium sample 132 through the chamber 112—between the input value 134 and the output valve 136 to create turbulence. Laser beams 124, 126 that pass through different portions of the turbulent flow randomly phase shift as the turbulence varies. This phase-shift effect can also be obtained by deliberately inducing pressure fluctuations or temperature fluctuations in the chamber 112 of the cavity 104. Pressure fluctuations within the chamber 112 may be obtained by rapidly dithered the input gas value 134 or the output gas valve 136 between opened and closed states. Temperature fluctuations may be obtained by rapidly switching a localized resistive heater 142 associated with the chamber 112 on and off.

Figure 10:
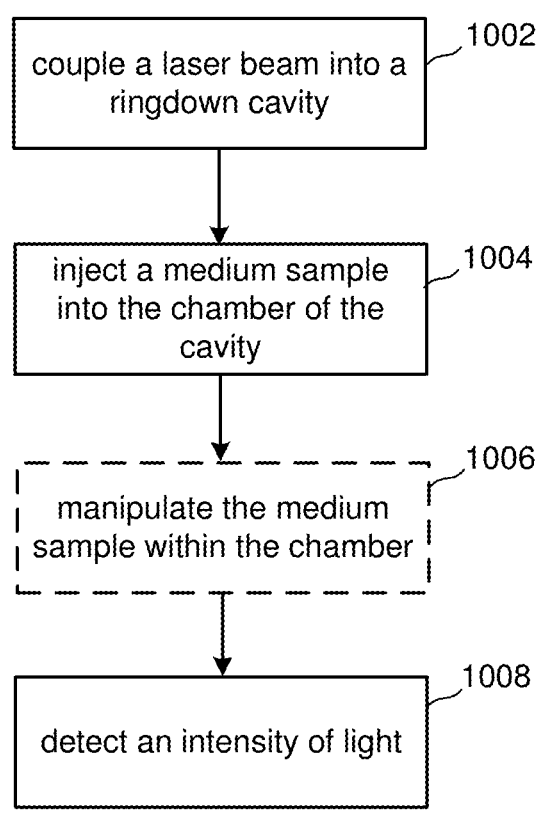
FIG. 10 is a flowchart of a method of performing an absorption measurement of a medium sample.

FIG. 10 is a flowchart of a method of performing an absorption measurement of a medium sample. The method may be performed by the optical system of FIG.1.

At block 1002, a laser beam 126 having a wavelength corresponding to an absorption region of interest is coupled into a ringdown cavity 104 comprising a chamber 112, an input mirror 114 at an input end of the chamber, an output mirror 118 at an output end of the chamber, and an optical axis 122 that extends through the center of the input mirror and the center of the output mirror.

The cavity geometry of the cavity 104 increases a re-entrant condition of the cavity relative to a conventional cavity comprised of two spherical mirrors. To this end, the cavity geometry may be defined in part by a respective design of each of the input mirror 114 and the output mirror 118 having a total spot overlap area less than the total spot overlap area of a spherical mirror. The cavity geometry may also be defined in part a cavity length 130 corresponding to a length that results in the smallest total spot overlap area or the highest transverse mode density for respective designs of each of the input mirror and the output mirror.

At block 1004, a medium sample is injected into the chamber 112.

At optional block 1006, the medium sample is manipulated within the chamber 112 to induce phase shifting of the laser beam within the chamber. Such manipulation may occur, for example, by inducing turbulence inside the chamber 112, by inducing pressure variations inside the chamber, or by inducing temperature variations inside the chamber.

At block 1008, an intensity of light of the wavelength corresponding to the absorption region of interest that extends through the output mirror 118 is detected at a detector 108.

Thus disclosed is an optical system 100 for performing an absorption measurement of a medium sample. The system 100 includes a laser source 102, a ringdown cavity 104, a coupling device 106 and a detector 108. The laser source 102 is configured to output a laser beam 126 having a wavelength corresponding to an absorption region of interest. The ringdown cavity104 includes a chamber 112 configured to receive the medium sample, an input mirror 114 at an input end of the chamber, an output mirror 118 at an output end of the chamber, and an optical axis 122 that extends through the center of the input mirror and the center of the output mirror. The coupling device 106 is configured to couple the laser beam 126 through the input mirror 114 into the chamber 112 as one of a single narrow-diameter laser beam or a large-diameter laser beam. The detector 108 is optically coupled with the cavity 104, and is configured to detect an intensity of light of the wavelength corresponding to the absorption region of interest that extends through the output mirror 118. A cavity geometry of the cavity 104 increases the re-entrant condition of the cavity relative to a conventional cavity comprised of two spherical mirrors.

The optical system 100 provides improved incoherent coupling into a cavity relative to conventional systems, thus resulting in a smaller cavity and improved signal-to-noise ratio. The resulting incoherent coupling obviates the alignment and frequency-matching restrictions noted above. The optical system 100 make for a smaller, higher sensitivity instrument that measures trace gases for a variety of applications, including environmental (greenhouse gas, isotope, and toxin monitoring), industrial (process control, contaminant monitoring, and safety), medical (breath and urine diagnostics), and military (atmospheric monitoring aboard Naval submarines) applications.

The various aspects of this disclosure are provided to enable one of ordinary skill in the art to practice the present invention. Various modifications to exemplary embodiments presented throughout this disclosure will be readily apparent to those skilled in the art. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. An optical system for performing an absorption measurement of a medium sample, the optical system comprising:
    a laser source configured to output a laser beam having a wavelength corresponding to an absorption region of interest;
    a ringdown cavity comprising a chamber configured to receive the medium sample, an input mirror at an input end of the chamber, an output mirror at an output end of the chamber, and an optical axis that extends through a center of the input mirror and a center of the output mirror, the ringdown cavity having a cavity geometry defined by:
        a first design of the input mirror and a second design of the output mirror, wherein the first design and the second design produce a total spot overlap area on the output mirror that is less than the total spot overlap area of a cavity geometry defined by a spherical input mirror and a spherical output mirror, and
        a cavity length;
    a coupling device configured to couple the laser beam through the input mirror into the chamber as one of a single narrow-diameter laser beam or a large-diameter laser beam; and
    a detector optically coupled with the ringdown cavity, and configured to detect an intensity of light of the wavelength corresponding to the absorption region of interest that extends through the output mirror,
        wherein the cavity geometry of the ringdown cavity increases a re-entrant condition of the ringdown cavity relative to a conventional cavity comprised of two spherical mirrors and the cavity length corresponds to a length that results in a highest transverse mode density for the respective designs of each of the input mirror and the output mirror.

2. The optical system of claim 1, wherein at least one of the first design and the second design is astigmatic.

3. The optical system of claim 1, wherein each of the first design and the second design is astigmatic.

4. The optical system of claim 1, wherein each of the first design and the second design is cylindrical.

5. The optical system of claim 1, wherein the first design is spherical and the second design is cylindrical.

6. The optical system of claim 1, wherein the coupling device is configured to couple a single narrow-diameter laser beam through the input mirror along an axis offset from the optical axis of the ringdown cavity.

7. The optical system of claim 1, wherein the first design is cylindrical and the second design is spherical.

8. The optical system of claim 1, wherein at least one of the first design and the second design is cylindrical.

9. An optical system for performing an absorption measurement of a medium sample, the optical system comprising:
a laser source configured to output a laser beam having a wavelength corresponding to an absorption region of interest;
a ringdown cavity comprising a chamber configured to receive the medium sample, an input mirror at an input end of the chamber, an output mirror at an output end of the chamber, and an optical axis that extends through a center of the input mirror and a center of the output mirror:
a coupling device configured to couple the laser beam through the input mirror into the chamber as one of a single narrow-diameter laser beam or a large-diameter laser beam; and
a detector optically coupled with the ringdown cavity, and configured to detect an intensity of light of the wavelength corresponding to the absorption region of interest that extends through the output mirror,
wherein a cavity geometry of the ringdown cavity increases a re-entrant condition of the ringdown cavity relative to a conventional cavity comprised of two spherical mirrors, and
wherein the coupling device comprises a collimator configured to couple a large-diameter laser beam through the input mirror as a plurality of laser beams along a corresponding plurality of axes, wherein at least one of the corresponding plurality of axes is offset from the optical axis.

10. An optical system for performing an absorption measurement of a medium sample, the optical system comprising:
a laser source configured to output a laser beam having a wavelength corresponding to an absorption region of interest;
a ringdown cavity comprising a chamber configured to receive the medium sample, an input mirror at an input end of the chamber, an output mirror at an output end of the chamber, and an optical axis that extends through a center of the input mirror and a center of the output mirror:
a coupling device configured to couple the laser beam through the input mirror into the chamber as one of a single narrow-diameter laser beam or a large-diameter laser beam; and
a detector optically coupled with the ringdown cavity, and configured to detect an intensity of light of the wavelength corresponding to the absorption region of interest that extends through the output mirror,
wherein a cavity geometry of the ringdown cavity increases a re-entrant condition of the ringdown cavity relative to a conventional cavity comprised of two spherical mirrors, and
wherein the ringdown cavity is configured to manipulate the medium sample within the chamber to induce phase shifting of the laser beam within the chamber.

11. The optical system of claim 10, wherein the ringdown cavity further comprises an input valve in fluid communication with a medium source, and configured to inject the medium sample into the chamber at a velocity that manipulates the medium sample by inducing turbulence inside the chamber.

12. The optical system of claim 10, wherein the ringdown cavity further comprises:
an input valve in fluid communication with a medium source, and configured to inject a medium sample into the chamber; and
an output valve in fluid communication with the chamber, and configured to discharge the medium sample from the chamber,
wherein at least one of the input valve and the output valve is further configured to switch between open and closed states at a rate that manipulates the medium sample by inducing pressure variations inside the chamber.

13. The optical system of claim 10, wherein the ringdown cavity further comprises a temperature device heater configured to switch on and off at a rate that manipulates the medium sample by inducing temperature variations inside the chamber.

14. A method of performing an absorption measurement of a medium sample, the method comprising:
coupling a laser beam having a wavelength corresponding to an absorption region of interest into a ringdown cavity comprising a chamber, an input mirror at an input end of the chamber, an output mirror at an output end of the chamber, and an optical axis that extends through a center of the input mirror and a center of the output mirror, wherein a cavity geometry of the ringdown cavity increases a re-entrant condition of the ringdown cavity relative to a conventional cavity comprised of two spherical mirrors;
injecting a medium sample into the chamber;
detecting an intensity of light of the wavelength corresponding to the absorption region of interest that extends through the output mirror; and
manipulating the medium sample within the chamber to induce phase shifting of the laser beam within the chamber.

15. The method of claim 14, wherein manipulating the medium sample comprises at least one of inducing turbulence inside the chamber, inducing pressure variations inside the chamber, and inducing temperature variations inside the chamber.

* * * * *